US012689037B2

(12) United States Patent
De Taeye et al.

(10) Patent No.: US 12,689,037 B2
(45) Date of Patent: Jul. 21, 2026

(54) COATED CATHODE

(71) Applicants: IMEC VZW, Leuven (BE); Katholieke Universiteit Leuven, Leuven (BE)

(72) Inventors: Louis De Taeye, Mechelen (BE); Philippe Vereecken, Hoegaarden (BE)

(73) Assignees: Imec vzw, Leuven (BE); Katholieke Universiteit Leuven, Leuven (BE)

( * ) Notice: Subject to any disclaimer, the term of this patent is extended or adjusted under 35 U.S.C. 154(b) by 479 days.

(21) Appl. No.: 18/263,498

(22) PCT Filed: Jan. 31, 2022

(86) PCT No.: PCT/EP2022/052173

§ 371 (c)(1),
(2) Date: Jul. 28, 2023

(87) PCT Pub. No.: WO2022/167356

PCT Pub. Date: Aug. 11, 2022

(65) Prior Publication Data

US 2024/0105959 A1 Mar. 28, 2024

(30) Foreign Application Priority Data

Feb. 3, 2021 (EP) .................................... 21155001

(51) Int. Cl.
*H01M 4/62* (2006.01)
*H01M 4/02* (2006.01)
(Continued)

(52) U.S. Cl.
CPC ......... *H01M 4/628* (2013.01); *H01M 4/0426* (2013.01); *H01M 4/131* (2013.01); *H01M 2004/021* (2013.01); *H01M 2004/028* (2013.01)

(58) Field of Classification Search
CPC .... H01M 4/628; H01M 4/0426; H01M 4/131; H01M 2004/021; H01M 2004/028
See application file for complete search history.

(56) References Cited

U.S. PATENT DOCUMENTS

2011/0052994 A1* 3/2011 Harada .................. C01G 45/00
                                                                  423/598
2011/0099798 A1* 5/2011 Nilsen ................... C23C 16/409
                                                                  427/126.3
(Continued)

FOREIGN PATENT DOCUMENTS

CN        107240684 A    10/2017
CN        113184901 A  *  7/2021    ............. C01B 32/05
(Continued)

OTHER PUBLICATIONS

Machine Translation of CN-113184901-A (Feb. 19, 2026) (Year: 2026).*

(Continued)

*Primary Examiner* — Matthew J Merkling
(74) *Attorney, Agent, or Firm* — McDonnell Boehnen Hulbert & Berghoff LLP

(57) ABSTRACT

A coated cathode, a device including the coated cathode and methods for preparation thereof is provided. The coated cathode includes: an active material (10) for supplying and storing $Li^+$ ions, an electrically conductive additive (12), and a coating (11), different from the active material (10), that coats surfaces of the active material (10), wherein the coating (11) comprises amorphous halogen-doped titanium oxide, and wherein the coating (11) has a thickness ranging from 1 to 20 nm.

16 Claims, 8 Drawing Sheets

<table>
<tr><td>(51)</td><td colspan="2"><b>Int. Cl.</b></td></tr>
<tr><td></td><td><i>H01M 4/04</i></td><td>(2006.01)</td></tr>
<tr><td></td><td><i>H01M 4/131</i></td><td>(2010.01)</td></tr>
</table>

(56) References Cited

U.S. PATENT DOCUMENTS

| | | | | |
|---|---|---|---|---|
| 2015/0162602 A1* | 6/2015 | Dadheech | ............... | H01M 4/62 |
| | | | | 427/113 |
| 2016/0351973 A1 | 12/2016 | Albano et al. | | |
| 2019/0157657 A1* | 5/2019 | Moitzheim | ......... | H01M 4/1315 |

FOREIGN PATENT DOCUMENTS

| | | | |
|---|---|---|---|
| JP | 2018-516438 A | 6/2018 | |
| JP | 2019521490 A | 7/2019 | |
| JP | 2020518119 A | 6/2020 | |
| KR | 102038422 B1 * | 10/2019 | ........... C01G 23/005 |
| WO | WO-2018007277 A1 * | 1/2018 | ........ H01M 4/13915 |
| WO | 2018197073 A1 | 11/2018 | |

OTHER PUBLICATIONS

Machine Translation of KR-102038422-B1 (Feb. 19, 2026) (Year: 2026).*

International Search Report and Written Opinion dated May 16, 2022 issued in International Application No. PCT/EP2022/052173.

Chen et al., "Silica Gel Solid Nanocomposite Electrolytes with Interfacial Connectivity Promotion Exceeding the Bulk Li-ion Conductivity of the Ionic Liquid Electrolyte Filler", Sci. Adv., 2020, vol. 6, eaav 3400, pp. 1-12.

Moitzheim S., Balder J.E., Poodt P., Unnikrishnan S., De Gendt S., Vereecken P.M. "Chlorine Doping of Amorphous TiO2 for Increased Capacity and Faster Li+-Ion Storage." . Chem. Mater. 2017, 29, 10007-10018.

* cited by examiner

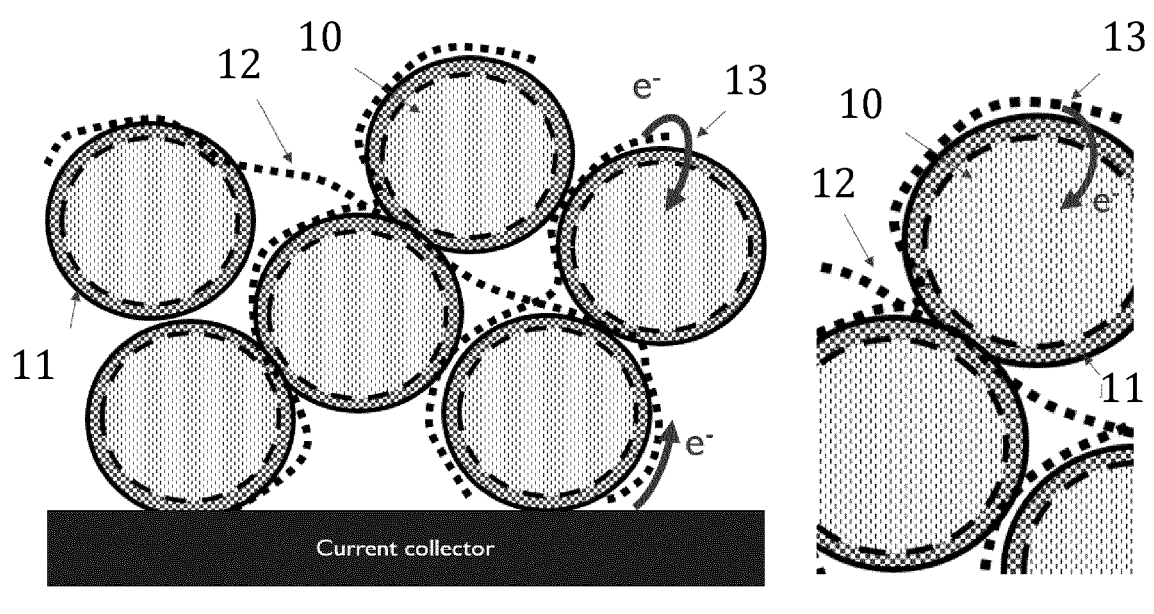
FIG. 11A                              FIG. 11B
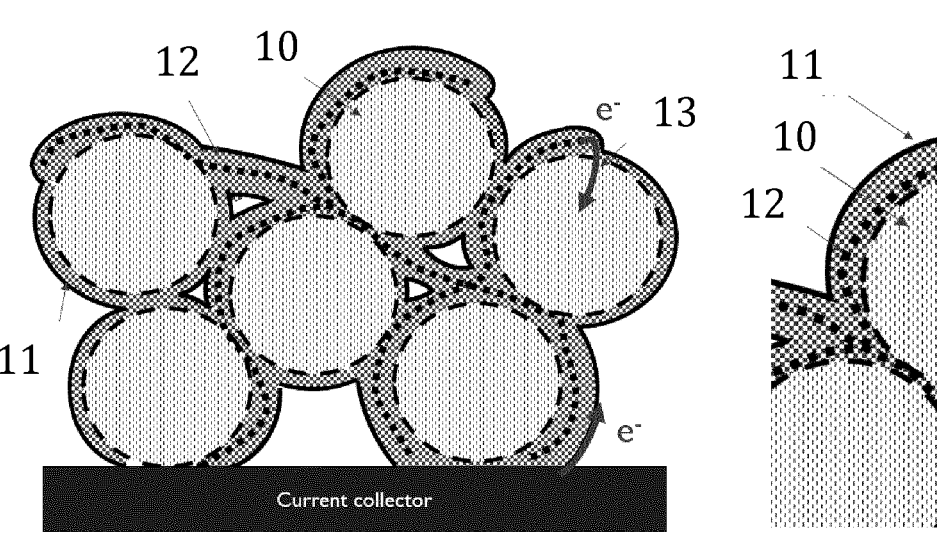
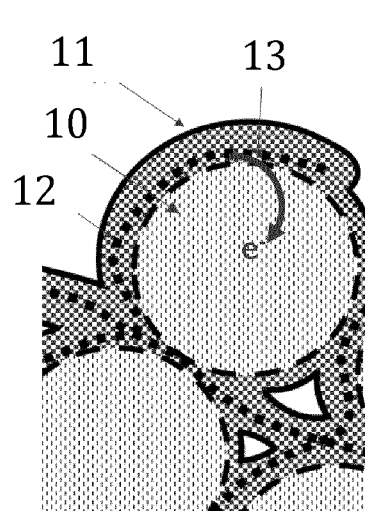
FIG. 12A                              FIG. 12B

COATED CATHODE

CROSS-REFERENCE

This Application is a section 371 U.S. national phase of PCT/EP2022/052173 filed Jan. 31, 2022, which in turn claims priority to EP 21155001.7 filed Feb. 3, 2021, both which are incorporated by reference in their entirety.

TECHNICAL FIELD OF THE INVENTION

The present invention relates to a coated cathode, a method for forming the coated cathode, a battery cell comprising the coated cathode, and a method for forming the battery cell.

BACKGROUND OF THE INVENTION

In an effort to increase the energy density of Li-ion batteries, new technologies have been developed enabling high-voltage cathodes, that is, wherein the cathode has a high discharge voltage (such as higher than 4V vs. Li$^+$/Li). Application of high-voltage cathodes has, however, been hindered by the decomposition of the electrolyte in batteries during cycling, i.e., cyclical charging and discharging, of the batteries. In the state of the art, a coating is sometimes applied to the electrodes of batteries to improve their lifetime and stability, e.g., with respect to cycling, so that they can be cycled more times and more efficiently. A plurality of coatings has already been tested in the past, ranging from metal-oxide coatings to organic coatings.

Although coatings are already a common strategy to improve lithium-ion and lithium metal battery electrodes, some issues related to the introduction of coatings persist. The diffusion of Li$^+$ ions through the coating should be sufficiently large to not hinder the rate performance of the battery. This issue may be solved by using thin coatings with a thickness up to or below one nanometer or by incomplete coverage of the active material such that Li-ions can still access through the holes while side reactions are minimized as the effective surface area is minimized. Still, such approaches affect the rate performance in a negative way and one has to settle for a trade-off between a desired reduction in parasitic reactions and thus longer battery life versus an undesired reduction in rate performance of the battery. Furthermore, when a coating material is comprised in such thin coatings, the properties of the coating material may be different from the properties of the bulk coating material. The coating is preferably electrochemically, chemically, and mechanically stable. Electrochemical and chemical instability could result in the dissolution of the coating, which may reduce the beneficial properties of the coating over time. Mechanical instability of the coating, e.g., upon expansion or contraction of the electrode material during cycling of the battery, may result in cracking and delamination of the coating.

There is therefore a need in the art for a coating that solves one or more of the above issues.

SUMMARY OF THE INVENTION

It is an object of the present invention to provide a good coated cathode, and good methods for making the coated cathode.

The above objective is accomplished by a method and device according to the present invention.

It is an advantage of embodiments of the present invention that the coating may have a thickness of above 1 nm, such as up to 20 nm, while the diffusion of the Li ions through the coating is still sufficiently fast for applications in batteries. It is an advantage of embodiments of the present invention that the large thickness may result in a high electrochemical, chemical, and mechanical stability of the coating. It is an advantage of embodiments that the coating material composition may produce extra flexibility in the coating, thereby preventing cracking of the coating as a result of expansion or contraction of the electrode material during cycling. It is an advantage of embodiments of the present invention that the large thickness may result in a coating that completely covers the cathode, thereby preventing any physical contact between the active material of the coated electrode and the electrolyte physically contacting, e.g. impregnating, the coated cathode. It is an advantage of embodiments of the present invention that, thereby, decomposition of the electrolyte may be prevented, even if the cathode provides a high discharge voltage (exceeding 4V vs. Li$^+$/Li). It is an advantage of embodiments of the present invention that the cycle-ability, shelf life, self-discharge rate, and stability of the electrode are improved by the coating.

In a first aspect, the present invention relates to a coated cathode comprising: an active material for supplying and storing ions, an electrically conductive additive, and a coating, different from the active material, that coats surfaces of the active material and possibly of the conductive additive, wherein the coating comprises amorphous halogen-doped titanium oxide, and wherein the coating has a thickness of from 1 to 20 nm.

In a second aspect, the present invention relates to a battery cell comprising: a coated cathode according to embodiments of the first aspect of the present invention, in physical contact with a first electrolyte, an anode, in physical contact with a second electrolyte, wherein the first electrolyte and the second electrolyte are the same or are different, and the battery cell is configured so that ions, comprised in the first electrolyte and the second electrolyte, can move between the first electrolyte and the second electrolyte.

In a third aspect, the present invention relates to a method for forming a coated cathode according to embodiments of the first aspect of the present invention, comprising: a) providing an active cathode material for supplying and storing Li ions (i.e. Li$^+$), b) depositing a coating, different from the active material, on exposed surfaces of the active material, wherein the coating comprises halogen-doped titanium oxide and has a thickness of from 1 to 20 nm, and c) providing a conductive additive, wherein step b) is performed either after step a) and before step c) or after both steps a) and c).

In a fourth aspect, the present invention relates to a method for forming the battery cell according to embodiments of the second aspect of the present invention, comprising: providing a coated cathode according to any embodiment of the first aspect, providing an anode, contacting the coated cathode with a first electrolyte and the anode with a second electrolyte, wherein the first electrolyte and the second electrolyte are the same or are different, and configuring the battery cell so that the Li$^+$ ions, comprised in the first electrolyte and the second electrolyte, can move between the first electrolyte and the second electrolyte.

In a fifth aspect, the present invention relates to the use of a coating comprising amorphous halogen-doped titanium oxide for coating an active material of a cathode.

Particular and preferred aspects of the invention are set out in the accompanying independent and dependent claims.

Features from the dependent claims may be combined with features of the independent claims and with features of other dependent claims as appropriate and not merely as explicitly set out in the claims.

Although there has been constant improvement, change, and evolution of devices in this field, the present concepts are believed to represent substantial new and novel improvements, including departures from prior practices, resulting in the provision of more efficient, stable, and reliable devices of this nature.

The above and other characteristics, features, and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 11A and FIG. 11B are schematic representations of a cross-section of a coated cathode according to embodiments of the present invention, comprising active material that is coated.

FIG. 12A and FIG. 12B are schematic representations of a cross-section of a coated cathode according to embodiments of the present invention, wherein active material and electrically conductive additive are coated.

Figure 1:
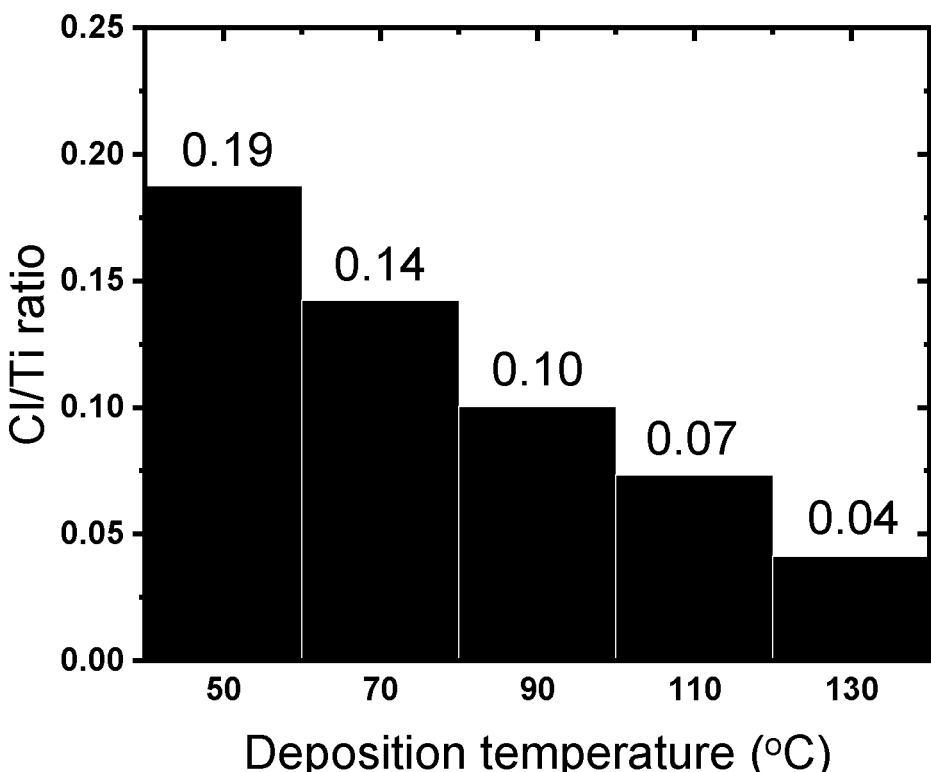
FIG. 1 is a plot of the chlorine-to-titanium atomic ratio for a range of coatings comprising chlorine-doped titanium oxide as a function of the temperature at which the coating was deposited.

In the different figures, the same reference signs refer to the same or analogous elements.

DESCRIPTION OF ILLUSTRATIVE
EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third, and the like in the description and in the claims, are used for distinguishing between similar elements and not necessarily for describing a sequence, either temporally, spatially, in ranking, or in any other manner. It is to be understood that the terms so used are interchangeable under appropriate circumstances and that the embodiments of the invention described herein are capable of operation in other sequences than described or illustrated herein.

Moreover, the terms top, bottom, over, under, and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps, or components as referred to, but does not preclude the presence or addition of one or more other features, integers, steps or components, or groups thereof. The term "comprising" therefore covers the situation where only the stated features are present and the situation where these features and one or more other features are present. The word "comprising" according to the invention therefore also includes as one embodiment that no further components are present. Thus, the scope of the expression "a device comprising means A and B" should not be interpreted as being limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures, and techniques have not been shown in detail in order not to obscure an understanding of this description.

In a first aspect, the present invention relates to a coated cathode comprising: an active material for supplying and storing $Li^+$ ions, an electrically conductive additive, and a coating, different from the active material, that coats surfaces of the active material and possibly the conductive additive, wherein the coating comprises amorphous halogen-doped titanium oxide, and wherein the coating has a thickness ranging from 1 to 20 nm.

As used herein and unless provided otherwise, the term "coated cathode" does not mean a cathode that is coated on a substrate but means a cathode that is coated by a coating.

Nevertheless, the coated cathode of the first aspect is typically in contact with a current collector and can have been coated on said current collector. In such embodiments, the coated cathode is a cathode that is both: a) coated by a coating and b) coated on a substrate (the current collector).

In embodiments, the coating is electronically non-conductive. Advantageously, the coating may prevent physical and electrical contact between the active material and the electrolyte, and optionally between the conductive additive and the electrolyte that may impregnate the coated cathode, which may prevent decomposition of the electrolyte. The decomposition may for instance occur when a sufficiently large potential difference is formed between the anode and the cathode to compromise the electrochemical stability of the electrolyte, but is not limited thereto. The decomposition may, for instance, result in the formation of a solid electrolyte interphase (SEI) barrier layer separating the active material from the electrolyte, wherein a mobility of $Li^+$ ions through the barrier layer i.e., between the electrolyte and the active material may be low. As a consequence, the active material may not be able to supply $Li^+$ ions to the electrolyte, or store $Li^+$ ions from the electrolyte. The coating may prevent the decomposition of the electrolyte and, thereby, the formation of the barrier layer.

In embodiments, the active material may be an oxide comprising Lithium and at least one transition metal.

In embodiments, the supplying of $Li^+$ ions by the active material may involve oxidizing a transition metal ion comprised in the active material (e.g. $Co^{3+} \rightarrow Co^{4+}$), thereby forming said $Li^+$ ions that can then diffuse into the electrolyte physically contacting (e.g., impregnating) the coated cathode. This process is called extraction or deintercalation. In embodiments, the storing of ions by the active material may involve the reduction of at least a transition metal ion comprised in the active material (e.g., $Co^{4+} \rightarrow Co^{3+}$) with the coincidental insertion of $Li^+$ ions into the active material (e.g., at the surface of the active material). This process is called insertion or intercalation.

In embodiments, the coating is different from the active material in that the coating and the active material comprise or consist of different materials. In embodiments, the active material comprises one of the following: a layered transition metal oxide (e.g. lithium nickel manganese cobalt oxide ($LiNi_xMn_yCo_zO_2$) wherein x+y+z=1), a spinel phase transition metal oxide (lithium manganese oxide ($LiMn_2O_4$), lithium nickel manganese oxide ($LiMn_{1.5}Ni_{0.5}O_4$)), or a polyanionic material ($Li_zXY$ with X=Fe, Ni, Co, Cr, Mn, and Y=phosphate group ($PO_4$), sulphate group ($SO_4$), or silicate ($SiO_4$), wherein z is adequate to ensure electroneutrality (e.g. z may be equal to 1 (e.g. $LiFePO_4$) or 2 (e.g. $Li_2MnSiO_4$).) The active material is for supplying and storing $Li^+$ ions, e.g., to an electrolyte physically contacting the coated electrode. In embodiments, the active material comprises a transition metal ion which reduces upon $Li^+$ ion insertion. In preferred embodiments, the active material may be for supplying and storing $Li^+$. In embodiments, the coating may act as a barrier for further ions different from the $Li^+$, wherein the further ions may, for instance, comprise further ions of metals or anions such as $O^{2-}$ or $PO_4^{3-}$, comprised in the active material, or further ions such as $O^{2-}$ or $PO_4^{3-}$ comprised in the electrolyte. Thereby, the active material may only supply the $Li^+$-ions to the electrolyte, and not the further ions.

In embodiments, the halogen-to-titanium atomic ratio of the coating is from 0.01 to 0.25, preferably 0.01 to 0.20, more preferably from 0.04 to 0.19 when measured by Rutherford Backscatter Spectroscopy. In embodiments, the halogen comprises chlorine.

In a preferred embodiment, the invention of the first aspect relates to a coated cathode comprising:
  an active material (10) for supplying and storing $Li^+$ ions,
  an electrically conductive additive (12), and
  a coating (11), different from the active material (10), that coats surfaces of the active material (10), wherein the coating (11) comprises amorphous chlorine-doped titanium oxide, wherein the coating (11) has a thickness ranging from 1 to 20 nm,
  wherein the chlorine-to-titanium atomic ratio of the coating (11) ranges from 0.04 to 0.19 when measured by Rutherford Backscatter Spectroscopy.

Advantageously, a diffusion coefficient of ions, such as Li$^+$, through the coating comprising halogen-doped titanium oxide may be large, e.g., larger than for a coating comprising undoped titanium oxide (see for example S. Moitzheim et al., Chlorine Doping of Amorphous TiO$_2$ for Increased Capacity and Faster Li$^+$-Ion Storage, Chemistry of Materials 29 (2017) pages 10007-10018). In embodiments, the thickness of the coating ranges from 1 to 20 nm, preferably from 3 to 10 nm. Advantageously, as the diffusion coefficient of ions may be large, the coating may be thick enough to have a sufficiently large electrochemical, chemical, and mechanical stability, without becoming blocking towards the ions. Furthermore, the thickness being at least 1 nm may facilitate the coating to cover the active material completely, even if a surface of the active material is rough.

In embodiments, amongst the mean coating thicknesses on the active material at the electrode/electrolyte interface, at the current collector interface, and at equidistance between both said interfaces, the largest of these mean coating thicknesses may be at most ten times larger than the smallest of these mean coating thicknesses. For instance, in these embodiments, if at the electrode/electrolyte interface the mean coating thickness is 10 nm, the mean coating thickness at the electrode/current collector interface is not smaller than 1 nm.

It is an advantage of embodiments of the present invention that the flexibility of the coating comprising halogen-doped titanium oxide may be larger than for a coating comprising undoped titanium oxide, so that the coating comprising halogen-doped titanium oxide may have a longer lifetime on cycling.

In embodiments, the coating on the active material is conformal. In embodiments, conformality comprises that a variation in thickness of the coating around each particle of the active material may, averaged over all particles, have a standard deviation from a mean thickness of the coating around said particle of less than 20%, such as less than 10%. A conformal coating may result in a uniform diffusion of ions through the coating, uniform with respect to different locations of the coating. Thereby, the expansion and contraction of the coating may be uniform, which may further improve a mechanical stability of the coating. In embodiments, the coating covers exposed surfaces of the active material. In embodiments, the active material comprises particles, possibly in physical contact with each other. In embodiments, the electrically conductive additive comprises a carbon additive, an electrically conductive polymer, a silicide, or an electrically conductive oxide. The most common electrically conductive additives are carbon additives and most typically carbon black. Advantageously, the electrically conductive additive improves electrical contact between the particles. In embodiments, the coating covers exposed surfaces of the active material and, optionally, of the electrically conductive additive. In embodiments, the coating covers exposed surfaces of the active material and of the electrically conductive additive. In these embodiments, preferably, the electrically conductive additive is in physical and hence electrical contact with the active material. Thereby, electron flow between the electrically conductive additive and the active material may be unhindered by the coating. As the active material may be in physical contact with the electrically conductive additive, the potential of the electrically conductive additive is typically the same as the potential of the active material, so that contact between the electrically conductive additive and the electrolyte may possibly induce electrochemical reactions within the electrolyte. In embodiments, the coating on the active material and on the electrically conductive additive is conformal.

In embodiments, amongst the mean coating thicknesses on the electrically conductive additive at the electrode/electrolyte interface, at the current collector interface, and at equidistance between both said interfaces, the largest of these mean coating thicknesses may be at most ten times larger than the smallest of these mean coating thicknesses. For instance, in these embodiments, if at the electrode/electrolyte interface the mean coating thickness on the electrically conductive additive is 10 nm, the mean coating thickness at the electrode/current collector interface is not smaller than 1 nm.

Preferably, the active material present at the electrode/electrolyte interface, at the current collector interface, and between both said interfaces is completely covered by the coating.

More preferably, the active material and the electrically conductive additive present at the electrode/electrolyte interface, at the current collector interface, and between both said interfaces is completely covered by the coating.

In embodiments, the coated cathode further comprises a polymer binder, different from the electrically conductive additive (and from the active material and the coating), bonded to the active material, to the electrically conductive additive (and to the current collector). Advantageously, the polymer binder may improve the mechanical stability of the coated cathode, and may ensure enduring physical and electrical contact between the active material and the electrically conductive additive, between the conductive additive and the current collector, and between the current collector and the active material. For instance, the polymer binder may bind the active material and the electrically conductive additive together. For instance, when the active material comprises particles, the polymer binder may bind the particles together. As the polymer binder may be electrically non-conductive, it may not be necessary to also coat the polymer binder. However, the polymer binder may be coated together with the active material and the electrically conductive additive to facilitate the production of the coated cathode comprising the polymer binder. Non-limiting examples of polymer binders are polyvinylidene difluoride (PVDF), a mixture of styrene butadiene rubber and sodium carboxymethyl cellulose (SBR+CMC), and polyacrylonitrile. In embodiments, the coating coats surfaces of the active material, of the electrically conductive additive, and of the polymer binder.

In embodiments, the coated cathode may comprise the active material, the conductive additive, and the polymer binder, all of them having the coating on surfaces thereof. In other embodiments, the coated cathode may comprise the active material and the conductive additive, both of them having the coating on surfaces thereof, and an uncoated polymer binder. In yet other embodiments, the coated cathode may comprise a coated active material, an uncoated conductive additive, and an uncoated polymer binder.

In embodiments, the coated cathode may be in physical contact with a first electrolyte as defined in any embodiments of the second aspect of the present invention. In embodiments, the first electrolyte may be porous. In embodiments, the first electrolyte may comprise a porous matrix comprising a plurality of interconnected pores. In embodiments, the pores may be covered by a first layer comprising a first material. In embodiments, the first layer may be as defined in the second aspect of the present invention. The first layer may for instance be a polymer or an ionic liquid. In embodiments, the polymer may be as defined in the second aspect of the present invention. In embodiments, the first layer of the first material may be covered by a second layer comprising an electrolyte compound, thereby forming a nanocomposite electrolyte.

In embodiments, the electrolyte compound may be as defined in any embodiment of the second aspect of the present invention.

In embodiments, the coated cathode is in physical contact with a nanocomposite electrolyte, thereby forming a composite electrode having a coating on surfaces of the active material and optionally on surfaces of the electrically conductive additive.

Any features of any embodiments of the first aspect may be independently as correspondingly described for any embodiment of any of the other aspects of the present invention.

In a second aspect, the present invention relates to a battery cell comprising:

a coated cathode according to embodiments of the first aspect of the present invention, in physical contact with a first electrolyte, and an anode, in physical contact with a second electrolyte, wherein the first electrolyte and the second electrolyte are the same or are different, and the battery cell is configured so that ions, comprised in the first electrolyte and the second electrolyte, can move between the first electrolyte and the second electrolyte.

Any features of any embodiments of the second aspect may be independently as correspondingly described for any embodiment of any of the other aspects of the present invention.

In embodiments, cathode refers to an electrode at which electrochemical reduction of the transition metal ions comprised in the active material may occur on the discharge of the battery cell and anode refers to an electrode at which electrochemical oxidation of the $Li^+$ ions or the oxidation of ions comprised in the active material may occur on the discharge of the battery cell. As the first electrolyte physically contacts the coated electrode, the $Li^+$ ions may move through the coating, between the active material and the first electrolyte. Thereby, the active material may supply $Li^+$ ions to the first electrolyte, by deintercalation of the $Li^+$ ions from the active material, through the coating, into the electrolyte. Thereby, the active material may store $Li^+$ ions from the electrolyte, by intercalation of the $Li^+$ ions from the electrolyte, through the coating, into the active material. In embodiments, the anode comprises a material for storing and supplying the $Li^+$ ions.

In embodiments, the battery being configured so that the $Li^+$ ions can move between the first electrolyte and the second electrolyte comprises that the first electrolyte and the second electrolyte comprise the same electrolyte, and wherein the first electrolyte physically contacts the second electrolyte, e.g., wherein there is no barrier separating the first electrolyte and the second electrolyte. In embodiments, the battery cell being configured so that the $Li^+$ ions can move between the first electrolyte and the second electrolyte comprises that an ionically conductive membrane, i.e., conductive for the $Li^+$ ions, is present, separating the first electrolyte from the second electrolyte. Advantageously, in these embodiments, the first electrolyte and the second electrolyte may be different, and the first electrolyte and the second electrolyte cannot become mixed, whereas the $Li^+$ ions may still move between the first electrolyte and the second electrolyte, that is, by moving through the ionically conductive membrane. In particular embodiments, the battery cell comprises a third electrolyte between the first electrolyte and the second electrolyte. In embodiments, the first electrolyte is separated from the third electrolyte by a first ionically conductive membrane. In embodiments, the second electrolyte is separated from the third electrolyte by a second ionically conductive membrane.

In embodiments, the first electrolyte and the second electrolyte may independently comprise any type of electrolyte. For instance, they may independently be a solid electrolyte (e.g., a polymer electrolyte or a composite electrolyte), or a liquid electrolyte. In embodiments, the first electrolyte and the second electrolyte may comprise any electrolyte composition (e.g., $LiPF_6$ in ethylene carbonate and dimethyl carbonate, . . . ). In other words, the present invention is not limited to any type or composition of electrolyte. In embodiments, at least one of the first electrolyte and the second electrolyte comprises a solid electrolyte, preferably a nanocomposite electrolyte. In other embodiments, both the first and the second electrolytes comprise a liquid electrolyte. In embodiments, the first electrolyte is a solid electrolyte and the second electrolyte is a solid electrolyte. Advantageously, in these embodiments, if the first electrolyte and the second electrolyte are different, the first electrolyte and second electrolyte may remain separated from each other, that is, may not become mixed without the need for an ionically conductive membrane. Advantageously, solid electrolytes may be inert, e.g., towards air or moisture, compared to liquid electrolytes, so that batteries comprising solid electrolytes may have an inherently increased safety. Furthermore, solid electrolytes may have a high energy density. Advantageously, nanocomposite electrolytes, a type of solid electrolyte, can have a particularly high $Li^+$ ion mobility. Nanocomposite electrolytes have previously been described for instance in EP3616250, and Chen et al., Science Advances 6 (2020) eaav3400. The nanocomposite electrolyte may, for instance, comprise a porous matrix comprising a plurality of interconnected pores covered by a first layer, which is in turn covered by a second layer. As an example, according to theory, the first layer comprising a first material, e.g. a polymer or an ionic liquid, may cover inner surfaces of the pores. An electrolyte compound, in turn, may cover the first layer, hence forming the second layer. Due to a combination of specific interactions between the matrix material, the first layer, and the second layer, an ion of the electrolyte compound e.g., $Li^+$, is relatively free to move through the pores, thereby being able to move fast between the electrodes. In embodiments, the matrix comprises an oxide of silicon, aluminum, zirconium, titanium, or a combination thereof. In embodiments, the ionic liquid comprises a cation selected from 1-pentyl-1-methyl pyrrolidinium, 1-butyl-1-methyl pyrrolidinium, 1-propyl-1-methyl pyrrolidinium, 1-ethyl-1-methyl pyrrolidinium, 1-butyl-3-methyl imidazolium, 1-ethyl-3-methyl imidazolium, 1,2-dimethyl-3-propyl imidazolium, 1,2-diethyl-3,5-dimethyl imidazolium, trimethyl-n-hexyl ammonium, N-butyl-N-methyl pyrrolidinium, N-methyl-N-propyl piperidinium, and N-ethyl-N-methyl morpholidinium, and an anion selected from $ClO_4^-$, $BF_4^-$, $PF_6^-$, $BH_4^-$, $PO_4^{3-}$, $Cl^-$, $Br^-$, $I^-$, $NO_3^-$, dicyanamide, thiocyanide, bistriflimide, bis(fluorosulfonyl)imide, bis(trifluoromethanesulfonyl)imide, bis(pentafluoroethylsulfonyl)imide, bis-(perfluoroethylsulfonyl)imide, trifluoromethanesulfonyl)acetamide, and bis(oxolato)borate. In embodiments, the polymer may comprise a polyether such as polyethylene oxide having a molecular weight ranging from 2,000 to 200,000 g/mol, and/or a copolymer derived from one of the following polymers: a polyether, preferably ethylene oxide or propylene oxide, a poly(methyl methacrylate), and a polyvinylidene fluoride. In embodiments, the electrolyte compound comprises a metal salt, the metal salt comprising $Li^+$, and an anion selected from $ClO_4^-$ (perchlorate), $BF_4^-$ (tetrafluoroborate), $PF_6^-$ (hexafluorophosphate), bistriflimide, bis(trifluoromethylsulfonyl)imide, bis(fluorosulfonyl)imide, bis-(perfluoroethylsulfonyl)imide, and BOB (bis(oxalate)borate). The anion may be also be selected from Triflate (trifluoromethaneslfonate), BETI (bis (perfluoroethanesulfonyl)imide), DFOB (difluoro(oxalato) borateBison), PDI (dicyano-pentafluoroethyl-imidazole), TDI (dicyano-trifluoromethyl-imidazole), DMSI (cyclo-difluoromethane-1,1-bis(sulfonyl)imide, HPSI (cyclo-hexafluoropropane-1,1-bis(sulfonyl)imide), DFOD (difluoro(oxalato)borate), BFMB (bis(fluoromalonato)borate), BISON (tatracyanoboarate), and DCTA (dicyanotriazolate).

In a third aspect, the present invention relates to a method for forming a coated cathode according to embodiments of the first aspect of the present invention, comprising: a) providing an active cathode material, i.e. an active material, for supplying and storing $Li^+$ ions, b) depositing a coating, different from the active material, on exposed surfaces of the active material, wherein the coating comprises halogen-doped titanium oxide and has a thickness ranging from 1 to 20 nm, and c) providing a conductive additive, wherein step b) is performed either after step a) and before step c) or after both steps a) and c).

Typically, the active cathode material is provided on a current collector, which is typically a metallic foil. For instance, the active cathode material can be drop cast on the current collector.

Any features of any embodiments of the third aspect may be independently as correspondingly described for any embodiment of any of the other aspects of the present invention.

In embodiments where step b) is performed after step a) and before step c), only the active cathode material is coated. In embodiments where step b) is performed after both steps a) and c), both the conductive additive and the active cathode material are coated. In preferred embodiments, step b) is performed after both steps a) and c). Advantageously, the conductive additive is in that way also coated and in physical contact with the active material. In embodiments wherein the coated cathode further comprises a binding polymer, the method comprises a further step a') of providing the binding polymer. In preferred embodiments, step a') is performed after step a) and before step b) and c), or after step a) and c) but before step b). Advantageously, in these embodiments, firstly, the active cathode material, the conductive additive, and the binding polymer may be provided, and secondly, the active cathode material, the conductive additive, and the binding polymer may be coated in a single step. In the most typical case, the active material, the conductive additive, and the polymeric binder (when present) are mixed together to form a slurry, which is then applied on the current collector. Advantageously, in these embodiments, the active cathode material, the conductive additive, and the binding polymer may be provided so that the active cathode material, the conductive additive, and the binding polymer may be mixed so that there is good electrical and physical contact between the active cathode material, the conductive additive, and the binding polymer.

In embodiments, the coating may be deposited by any method suitable for depositing the coating, such as by atomic layer deposition, chemical vapor deposition (CVD) or chemical solution deposition (CSD) (e.g. a sol-gel process), preferably by atomic layer deposition. In embodiments, depositing the coating is performed by atomic layer deposition at a temperature ranging from 30 to 150° C. Atomic layer deposition may be highly suitable for depositing a thin, conformal coating over all exposed surfaces of the active material, and possibly of the conductive additive, and possibly of the binding polymer. Advantageously, by performing the atomic layer deposition in this temperature range, deposition may be performed on each of the active material, the polymer binder, and the conductive additives, without damaging or decomposing any of these materials during the atomic layer deposition. Indeed, using higher temperatures could lead to the thermal decomposition of the materials. Furthermore, the halogen-to-titanium atomic ratio of the coating that is deposited may depend on the temperature at which the atomic layer deposition is performed. Thereby, the halogen-to-titanium atomic ratio of the coating may be tuned by tuning the temperature. A lower temperature typically corresponds to a higher halogen-to-titanium atomic ratio. When the coating has a higher halogen-to-titanium atomic ratio, the coating may have a higher flexibility, and $Li^+$ may have a larger diffusion coefficient through the coating. Preferably, depositing the coating is performed by atomic layer deposition at a temperature ranging from 50 to 130° C. In embodiments, the atomic layer deposition is performed using $TiCl_4$ as a precursor and $H_2O$ or ozone as an oxidizing agent.

In a preferred embodiment of the fourth aspect, the present invention may relate to a method for forming a coated cathode according to any embodiment of the first aspect, comprising:

a) providing an active cathode material (10) for supplying and storing $Li^+$ ions,
   b) depositing a coating (11) by atomic layer deposition at a temperature ranging from 50 to 130° C., different from the active material (10), on exposed surfaces of the active material (10), wherein the coating comprises chlorine-doped titanium oxide and has a thickness ranging from 1 to 20 nm, and
   c) providing a conductive additive (12),
   wherein step b) is performed either after step a) and before step c) or after both steps a) and c).

In a fourth aspect, the present invention relates to a method for forming the battery cell according to embodiments of the second aspect of the present invention, comprising: providing a coated cathode according to embodiments of the first aspect of the present invention, providing an anode, contacting the coated cathode with a first electrolyte and the anode with a second electrolyte, wherein the first electrolyte and the second electrolyte are the same or are different, and configuring the battery cell so that the $Li^+$ ions, comprised in the first electrolyte and the second electrolyte, can move between the first electrolyte and the second electrolyte.

Any features of any embodiments of the fourth aspect may be independently as correspondingly described for any embodiment of any of the other aspects of the present invention.

Contacting the coated cathode with the first electrolyte may comprise contacting exposed surfaces of the coated cathode with the first electrolyte. In embodiments, all exposed surfaces of the coated cathode are contacted with the first electrolyte. Contacting the anode with the second electrolyte may comprise contacting exposed surfaces of the anode with the second electrolyte. In embodiments, all exposed surfaces of the anode are contacted with the second electrolyte. In embodiments wherein the first and/or second electrolyte comprises a solid electrolyte, the solid electrolyte may for instance be provided by contacting, e.g. impregnating, the electrode, e.g. the coated cathode or the anode, with a liquid precursor, that comprises a precursor to the solid electrolyte, and inducing a reaction in the liquid precursor to form the solid electrolyte. In embodiments, the liquid precursor may comprise: a precursor to the matrix material, preferably tetraethyl orthosilicate, tetramethylorthosilicate, or tetrapropylorthosilicate; an electrolyte compound; and a template material comprising a first material, e.g., a polymer or an ionic liquid. In embodiments, the reaction may be induced by adding an acid or a base. The template material may advantageously guide the formation of pores in the solid electrolyte, thereby forming a porous matrix comprising a plurality of interconnected pores covered by a first layer comprising the first material, which is in turn covered by a second layer comprising the electrolyte compound, thereby forming a nanocomposite electrolyte such as described in EP3616250, and Chen et al., Science Advances 6 (2020) eaav3400.

In a fifth aspect, the present invention relates to the use of a coating comprising halogen-doped titanium oxide for coating an active material of a cathode.

In a preferred embodiment of the fifth aspect, the present invention relates to the use of a coating (11) comprising amorphous chlorine-doped titanium oxide for coating an active material (10) of a cathode, wherein the chlorine-to-titanium atomic ratio of the coating (11) ranges from 0.04 to 0.19 when measured by Rutherford Backscatter Spectroscopy.

Any features of any embodiments of the fifth aspect may be independently as correspondingly described for any embodiment of any of the other aspects of the present invention.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Example 1: Forming a Coated Cathode

In a first example, a coated cathode is obtained. For example, an active cathode material, i.e. an active material, in this example comprising Lithium Manganese Oxide (LMO), may be deposited. In this example, a Kurt J. Lesker sputter tool is used for depositing Lithium Manganese Oxide on a target. However, the invention is not limited thereto, and the skilled person will realize that any method suitable for obtaining the active cathode material may be used. In this example, annealing of the active cathode material is performed. After the annealing, the samples, i.e., Lithium Manganese Oxide deposited on the target, are stored in an Ar atmosphere. In this example, a film of stoichiometric, spinel Lithium Manganese Oxide is obtained.

Subsequently, a coating is deposited on the film of Lithium Manganese Oxide using Atomic Layer Deposition (ALD). For this, $TiCl_4$ (obtained from Pegasus Chemicals) is used as a precursor, and $H_2O$ is used as an oxidizing agent. The deposition was performed in a Picosun ALD reactor at reactor temperatures ranging from 50° C. to 130° C. A pulsing time of 0.2 seconds and 0.5 seconds is used for the $TiCl_4$ precursor and $H_2O$ precursor, respectively.

Figure 2:
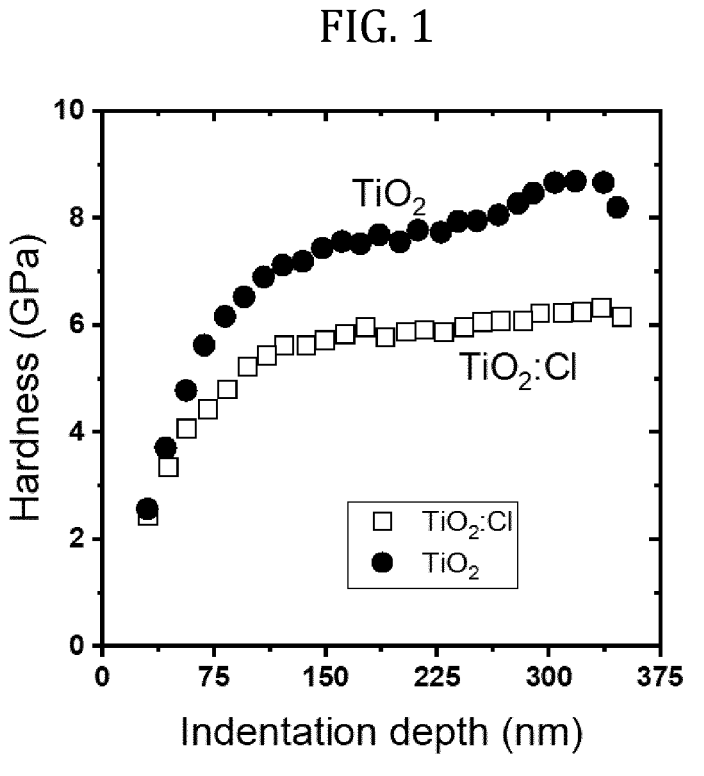
FIG. 2 is a plot of the hardness of different coatings as a function of indentation depth, measured using a nanoindentation technique.

Rutherford Backscatter Spectroscopy (RBS) was used to determine the absolute concentration of titanium and chlorine atoms in the coatings deposited at different temperatures. An incident 40 nA $He^+$ beam with a beam energy of 1.523 MeV was used. The analysis is performed using in-house developed software. Reference is made to FIG. 1, which is a plot of the chlorine-to-titanium atomic ratio, i.e., Cl/Ti, for a range of coatings as a function of temperature at which the coating was deposited. Clearly, within the temperature range used, the chlorine-to-titanium atomic ratio increases with the reduction of the temperature, ranging from a minimum of Cl/Ti=0.04 for coatings deposited at 130° C., up to Cl/Ti=0.19 for coatings deposited at 50° C. Reference is made to FIG. 2, which is a plot of the hardness of a coating of composition $TiO_{1.9}Cl_{0.19}$ and of undoped titanium oxide as a function of indentation depth, measured using a nanoindentation technique, which gives a measure of the hardness i.e. flexibility of a material to deformation, which roughly correlates with a tensile strength of the material. Nanoindentation consists of pressing a sharp probe tip into the sample. During this process, both the displacement and loading is measured. As the probe is pressed into the sample, the loading curve is measured, which contains the elasto-plastic behaviour of the material. This is contrary to the unloading curve, which only contains the elastic behaviour of the film. After each (un)loading curve is obtained, the crack length formed in the film is measured.

Combining all the variables allows the hardness and elastic modulus to be determined separately. As is clear from FIG. 2, the chlorine-doped titanium oxide coating has a significantly lower hardness than the undoped titanium oxide.

Example 2: Electrochemical Analysis of the Coated Cathode

In this example, electrochemical analysis is performed on a range of samples, wherein each sample comprises an 88 nm thick Lithium Manganese Oxide film of which a top surface is coated with a coating. Herein, the coating of the different samples comprises: $TiO_{1.98}Cl_{0.04}$ with a thickness of 3 nm and 5 nm; $TiO_2$ with a thickness of 5 nm; and $TiO_{1.9}Cl_{0.19}$ with a thickness of 1 nm, 3 nm and 5 nm.

For the electrochemical analysis, electrochemical measurements were conducted using a custom-built three-electrode Teflon cell. The Teflon cell comprises a vertical open-ended compartment and a second semi-open-ended compartment. The compartments are filled with an electrolyte. In this example, the electrolyte is a 0.94M $LiClO_4$ solution, that is prepared by adding propylene carbonate (PC) (anhydrous, Sigma-Aldrich) to 10 g of $LiClO_4$ (battery grade, dry, 99.99%, Sigma Aldrich) to make the final 100 ml electrolyte solution. The two compartments are connected by a horizontal capillary to enable ion exchange. The sample is placed underneath the open-ended compartment so that the electrolyte contacts the coated top surface of the samples. A DuPont Kalrez O-ring is used to prevent electrolyte leakage from the Teflon cell over the sample. Lithium ribbons are placed into the open ends of both vertical compartments and serve as counter and reference electrode.

The electrochemical measurements were conducted using an M101 Metrohm potentiostat, which was operated using the Metrohm Nova software package. The electrochemical measurements were conducted inside an Ar filled MBraun glovebox ($O_2$ and $H_2O$ content<0.1 ppm). The electrochemical measurements comprise a first cyclic voltammetry, followed by a galvanostatic charge-discharge, followed by a second cyclic voltammetry.

Figure 3:
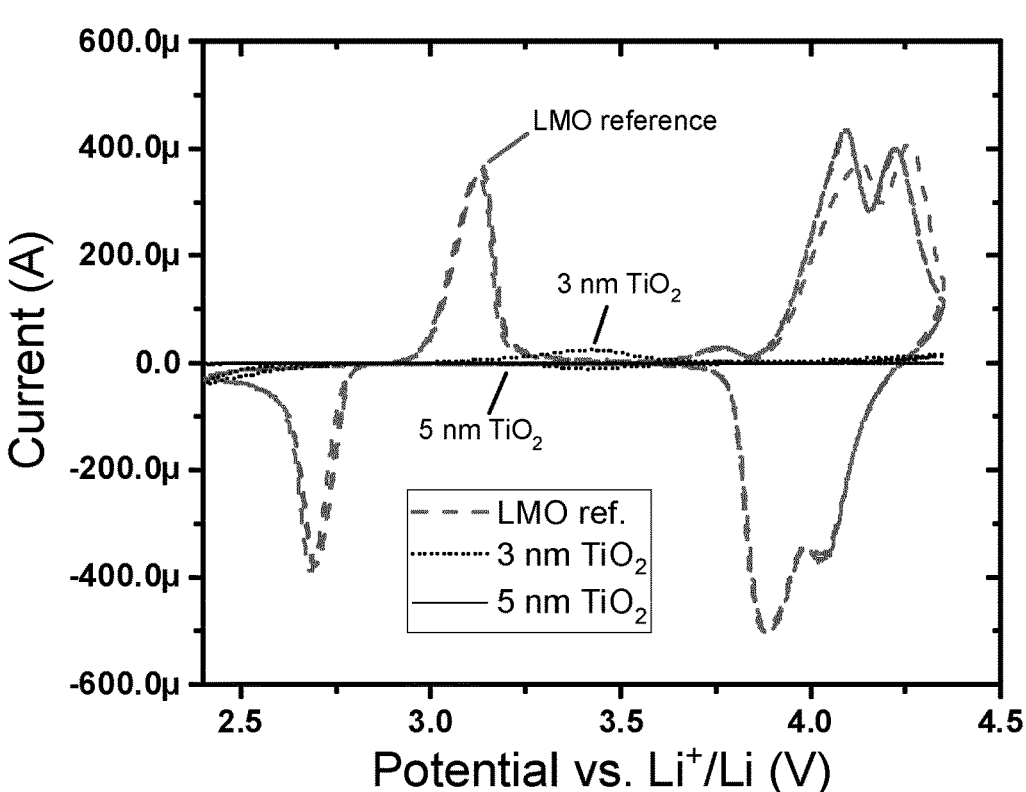
FIG. 3 is a cyclic voltammogram of samples comprising Lithium Manganese Oxide coated with an undoped titanium oxide coating.
Figure 4:
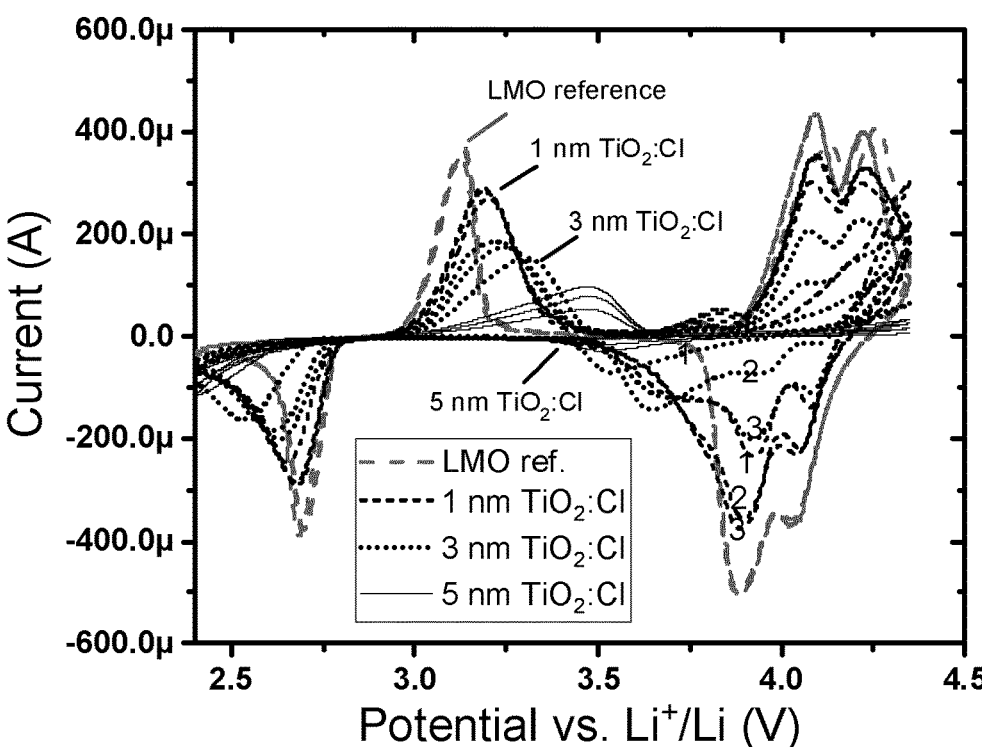
FIG. 4 is a cyclic voltammogram of samples comprising Lithium Manganese Oxide coated with a chlorine-doped titanium oxide coating.

The first cyclic voltammetry is performed by first applying an Open Current Potential and shifting the voltage applied to the sample to 4.35V vs. $Li^+/Li$. Next, the voltage applied to the sample was swept five times between 2.4V and 4.25V vs. Li$^+$/Li at a scan rate of 10 mV/s. Reference is made to FIG. 3, which is a cyclic voltammogram of samples comprising Lithium Manganese Oxide coated with an undoped titanium oxide coating. Reference is further made to FIG. 4, which is a cyclic voltammogram of samples comprising Lithium Manganese Oxide coated with a chlorine-doped titanium oxide coating of composition TiO$_{1.9}$Cl$_{0.19}$. Clearly, for coatings having a same thickness, the detected current is considerably larger for the chlorine-doped titanium oxide than for the undoped titanium oxide. For the sample comprising a 5 nm thick undoped titanium oxide coating, almost no current was detected, showing that the coating is almost completely blocking the Li$^+$ ions in that sample. However, for the sample comprising 5 nm thick chlorine-doped titanium oxide, a larger current is detected even than for the sample comprising a 3 nm thick undoped titanium oxide coating. This result clearly shows the larger Li$^+$ ion diffusivity for the chlorine-doped titanium oxide. Advantageously, the thickness of chlorine-doped titanium oxide coatings may be much larger than for undoped titanium oxide coatings, while the Li$^+$ ion diffusivity is still large enough for the coating to be usable in batteries.

The galvanostatic charge-discharge experiments were conducted on the samples to determine a rate performance of the samples. The rate performance is the charge storage capacity of the active material as a function of the charge and discharge rate, i.e., on the applied currents. The charge-discharge curves are measured between 2.4V and 4.25V vs. Li$^+$/Li. The applied areal current density at a C-rate of 1C corresponds to 8.7 μA/cm$^2$, and was derived from the amount of manganese in the Lithium Manganese Oxide film, which measured using RBS. The RBS gives the total amount of manganese in the sample per unit area, i.e., # atoms/cm$^2$. The capacity of LMO is equal to 1 Li per Mn atom (when cycled between 2.4V and 4.25V vs. Li$^+$/Li). From this, the theoretical capacity can be calculated (and consequently also the current corresponding to 1C (i.e. total charge/3600 s)

Figure 6:
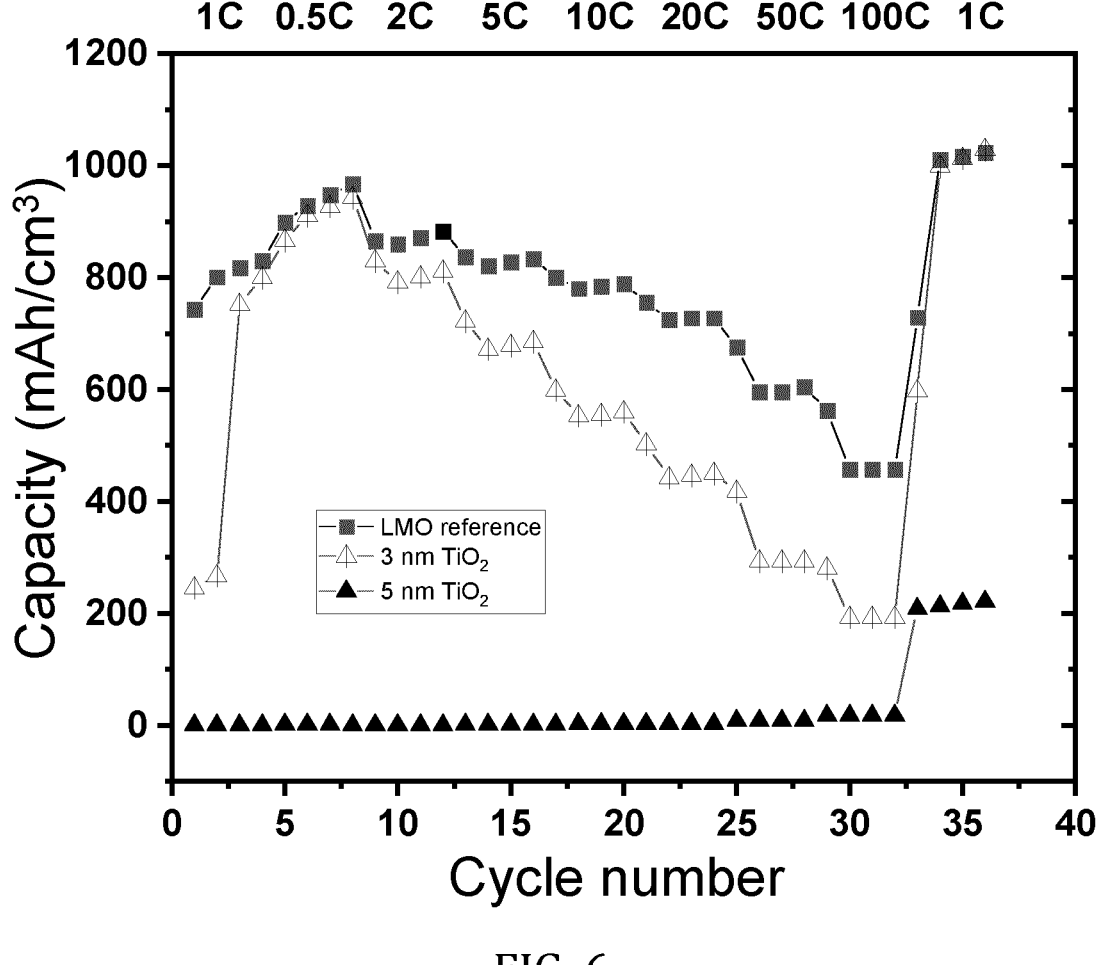
FIG. 6 is a plot of the volumetric capacity of samples comprising Lithium Manganese Oxide coated with undoped titanium oxide as a function of C-rate.

Herein, the Crate is a measure of a rate at which a battery may be assumed to be charged or discharged relatively to the calculated theoretical maximum capacity: thereby, C-rate scales with the applied current during charging and discharging, with xC corresponding to an expected charging time of 1/x hour. A volumetric capacity, which is the capacity per volume of active material in the sample, was determined for each sample at a C-rate of 1C, 0.5C, 2C, 5C, 10C, 20C, 50C, 100C, and again at 1C, cycling the material five times at each of the C-rates. Reference is made to FIG. 6, wherein the volumetric capacity of a sample comprising Lithium Manganese Oxide coated with undoped titanium oxide is plotted as a function of C-rate. Compared to an uncoated Lithium Manganese Oxide reference sample, the Lithium Manganese Oxide coated with 3 nm of undoped titanium oxide has a comparatively low volumetric capacity at all C-rates. The Lithium Manganese Oxide coated with 5 nm of undoped titanium oxide has a negligible volumetric capacity at all C-rates, which is a result of the very low diffusion rate of lithium in undoped titanium oxide coating.

Figure 5:
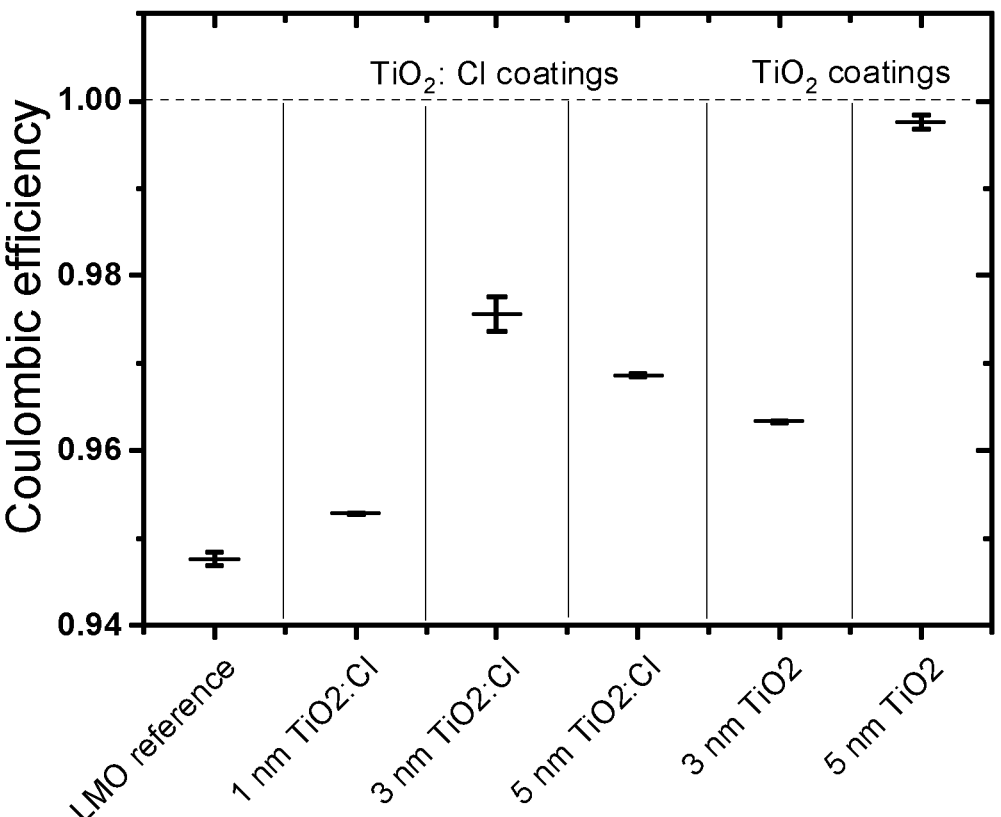
FIG. 5 is a plot of the coulombic efficiency for samples comprising Lithium Manganese Oxide that is uncoated, coated with undoped titanium oxide, and coated with chlorine-doped titanium oxide.

From the galvanostatic charge-discharge experiments, a coulombic efficiency for each sample may be determined, by: dividing the integral of the reduction current (i.e. charge associated with the discharging step) by the integral of the oxidation current (i.e. charge associated with the charging step). Ideally, the coulombic efficiency is approximately 1.00, so that the amount of charged released and corresponding manganese oxidation, during the charging step, equals the amount of charge stored in the active material and corresponding manganese reduction, during the discharging step, i.e., the amount of lithium stored in the active material is completely extracted from the material and replaced upon discharge during a full cycle. Reference is made to FIG. 5, wherein the calculated coulombic efficiency is shown for the different samples, and for a coulombic efficiency determined for uncoated Lithium Manganese Oxide. The coulombic efficiencies for the samples comprising 3 nm and 5 nm chlorine doped titanium oxide, which are 98% and 97% respectively, exceeds that of 3 nm undoped titanium oxide, which is ~96.5%, signifying improved electrochemical stability. Although best results were achieved for 5 nm thick undoped amorphous titanium oxide, for which a coulombic efficiency of approximately 1.00 is achieved, the diffusion rate of Li$^+$ through the 5 nm thick undoped amorphous titanium oxide was from the cyclic voltammograms observed to be extremely low.

Figure 7:
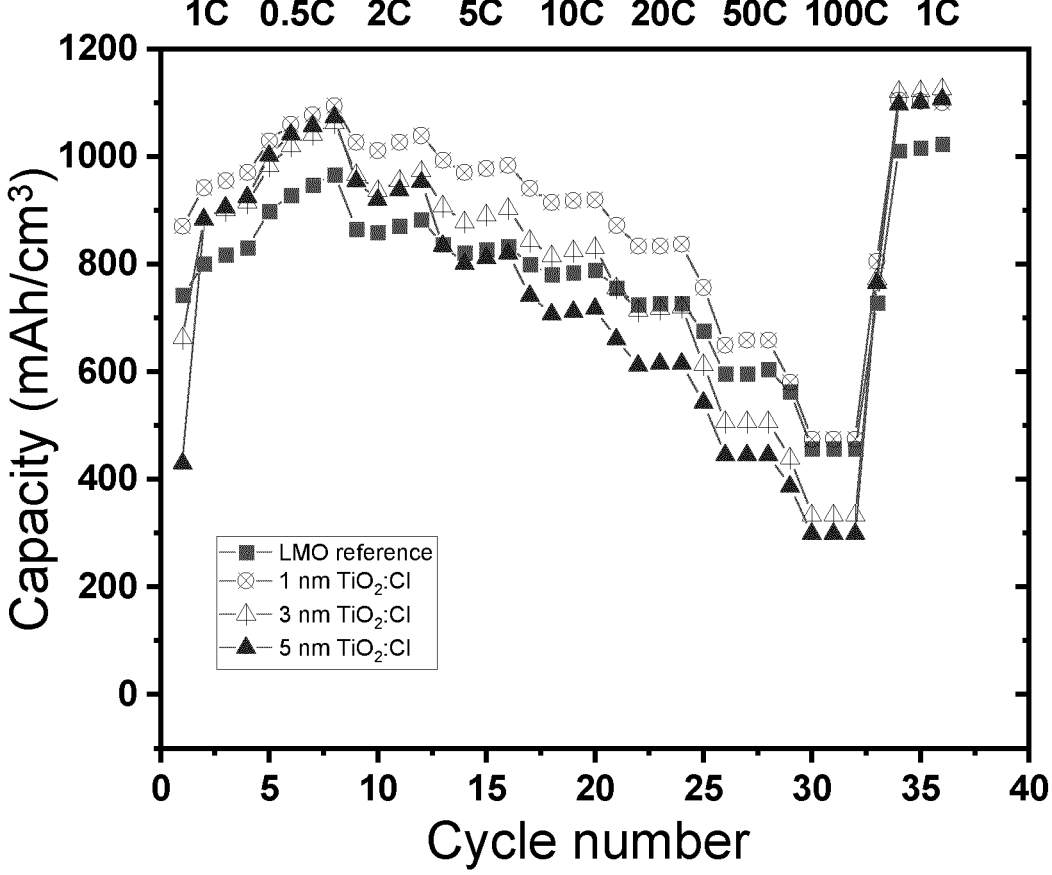
FIG. 7 is a plot of the volumetric capacity of samples comprising Lithium Manganese Oxide coated with chlorine-doped titanium oxide as a function of C-rate.

Reference is made to FIG. 7, where the volumetric capacity of samples comprising Lithium Manganese Oxide coated with chlorine-doped titanium oxide is plotted as a function of C-rate. The volumetric capacity at all C-rates of these samples is higher than or comparable to that of the uncoated Lithium Manganese Oxide reference, and in all cases higher than that of the Lithium Manganese Oxide coated with undoped titanium oxide. The coatings with a thickness of 5 nm show the largest difference. This can be attributed to the difference in diffusion coefficient: 5 nm undoped titanium oxide coatings become blocking to the Li$^+$ ions, whereas the 5 nm chlorine doped titanium oxide coatings are permeable to the Li$^+$ ions. Indeed, the volumetric capacity of Lithium Manganese Oxide coated with 5 nm chlorine doped titanium oxide is similar to uncoated Lithium Manganese Oxide. The volumetric capacity measured for Lithium Manganese Oxide coated with 1 nm chlorine-doped titanium oxide is improved over the uncoated counterpart. Without being bound by theory, it is believed that this may be attributed to a reduced decomposition of the electrolyte solution when these high voltages are applied.

Figure 8:
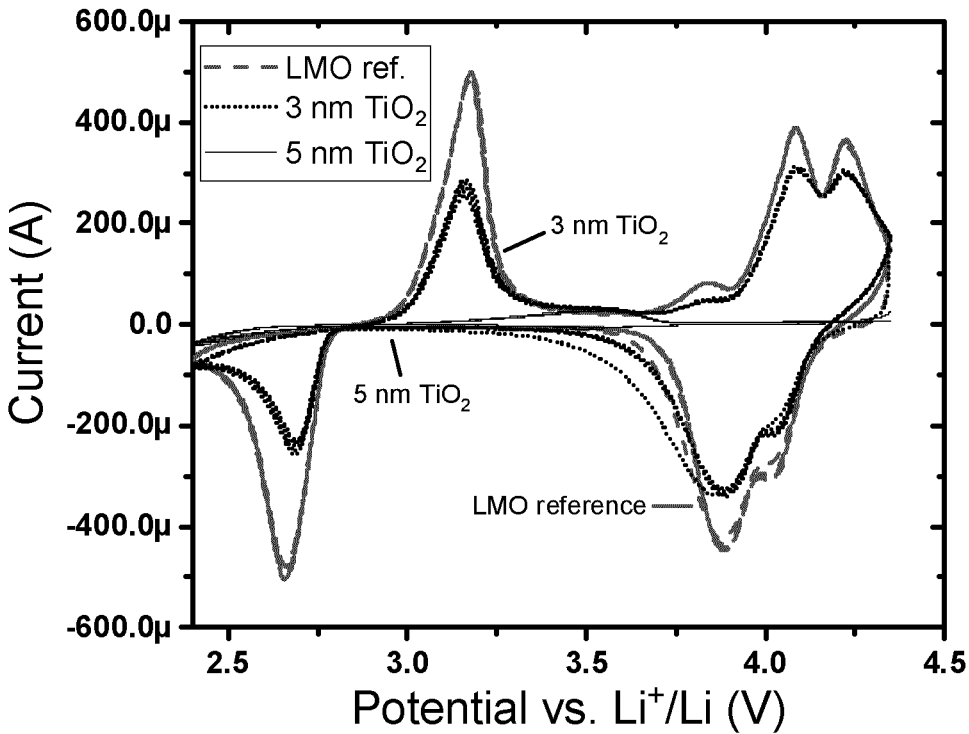
FIG. 8 is a cyclic voltammogram of samples comprising Lithium Manganese Oxide coated with undoped titanium oxide.
Figure 9:
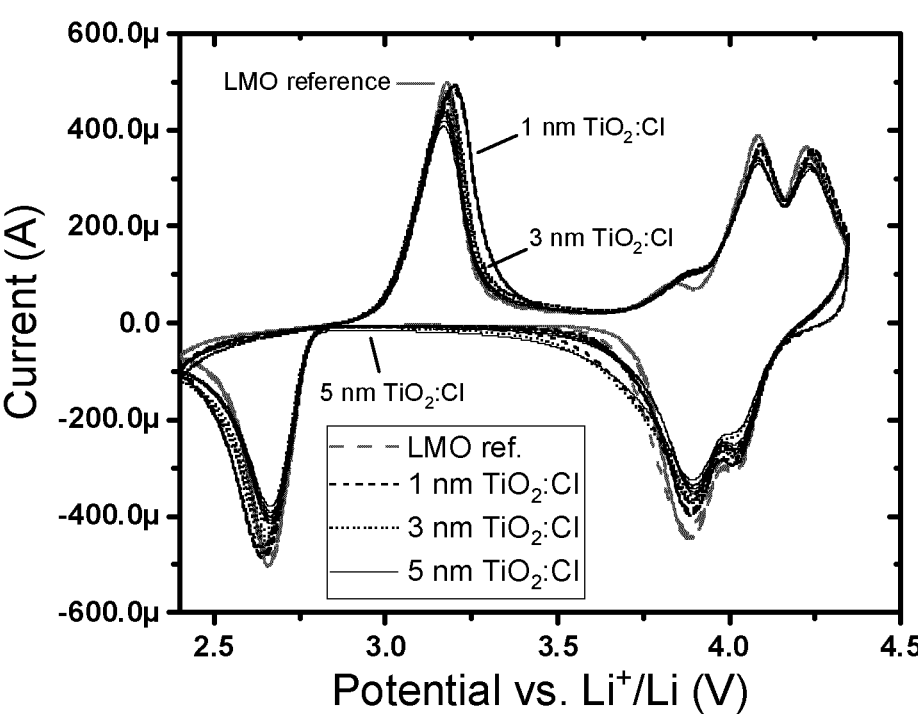
FIG. 9 is a cyclic voltammogram of samples comprising Lithium Manganese Oxide coated with chlorine-doped titanium oxide.

The second cyclic voltammetry is done by starting at 4.25V vs. Li$^+$/Li and cycling the sample 5 times between 2.4V and 4.35V vs. Li$^+$/Li at a scan rate of 10 mV/s. Reference is made to FIG. 8, which is a cyclic voltammogram of samples comprising Lithium Manganese Oxide coated with undoped titanium oxide. Reference is made to FIG. 9, which is a cyclic voltammogram of samples comprising Lithium Manganese Oxide coated with chlorine-doped titanium oxide. In FIG. 9, the two cathodes coatings show very similar currents, independently of their thickness. This is likely linked to the increased diffusion coefficient obtained with the coating of the present invention. Low current corresponds to a higher internal resistance. In FIG. 8, the thick undoped coatings have a clear increase in the internal resistance, which scales with the thickness. The doped samples of FIG. 9 have no significant increase in the internal resistance as the thickness increases.

Figure 10:
FIG. 10 is a TEM image, obtained after the electrochemical measurements, of Lithium Manganese Oxide coated with a chlorine-doped titanium oxide coating with a thickness of 5 nm.
Figure 10:
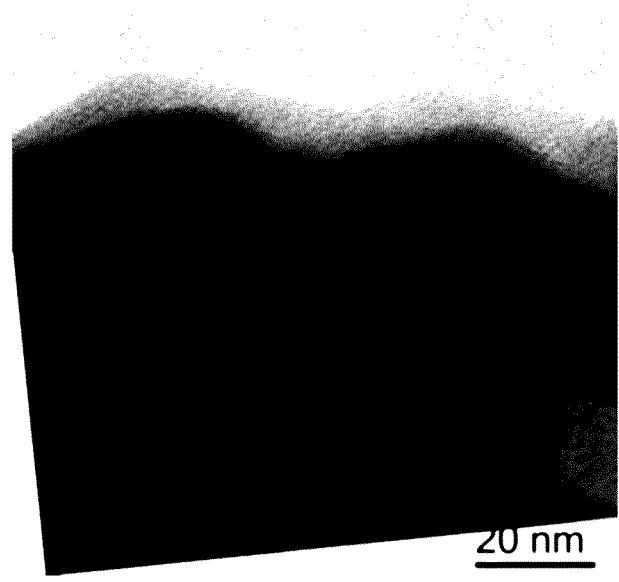

TEM images were obtained of the samples both before and after the electrochemical measurements. Reference is made to FIG. 10, which is a TEM image obtained after the electrochemical measurements, of a sample comprising active material 10 i.e., Lithium Manganese Oxide, coated with a chlorine-doped titanium oxide coating 11 with a thickness of 5 nm, wherein the coating with a chlorine-to-titanium ratio of 0.19. No difference was observed between TEM images obtained before and TEM images obtained after the electrochemical measurements, indicating high chemical, electrochemical and mechanical stability of the coating.

Example 3: A Coated Cathode

Reference is made to FIG. 11A and FIG. 11B, which are schematic representations of a cross-section of a coated cathode according to embodiments of the present invention. The coated cathode comprises active material 10 for supplying and storing Li$^+$ ions, coated with a coating 11 comprising amorphous halogen-doped titanium oxide. The coated cathode further comprises an electrically conductive additive 12 to improve electrical contact between particles of the active material 10. In this example, according to embodiments of the present invention, the electrically conductive additive 12 is not coated by the coating 11. In this example, the coating 11 is present between the electrically conductive additive 12 and the active material 10. In FIG. 11A and FIG. 11B, furthermore, a schematic route 13 for electrons through the coated cathode is indicated. As the active material 10 is coated, but the electrically conductive additive 12 is not coated, electrons have to flow through the coating 11 to move between the electrically conductive additive 12 and the active material 10. As amorphous halogen-doped titanium oxide may be electrically nonconductive, the coating 11 may form a barrier for electrons moving between the electrically conductive additive 12 and the active material 10.

Reference is made to FIG. 12A and FIG. 12B, which are schematic representations of a cross-section of a coated cathode according to embodiments of the present invention. The coated cathode comprises active material 10 for supplying and storing Li$^+$ ions, coated with a coating 11 comprising amorphous halogen-doped titanium oxide. The coated cathode further comprises an electrically conductive additive 12 to improve electrical contact between particles of the active material 10 and the current collector. In this example, according to embodiments of the present invention, the electrically conductive additive 12 is coated by the amorphous halogen-doped titanium oxide coating. In FIG. 12A and FIG. 12B, furthermore, a schematic route 13 for electrons through the coated cathode is indicated. As the active material 10 and the electrically conductive additive 12 are coated so that physical contact between the active material 10 and the electrically conductive additive 12 is retained, the electrons do not have to flow through the coating 11 to move between the electrically conductive additive 12 and the active material 10. Therefore, embodiments wherein the coating 11 coats the electrically conductive additive 12 and the active material 10 may be preferred.

It is to be understood that although preferred embodiments, specific constructions, and configurations, as well as materials, have been discussed herein for devices according to the present invention, various changes or modifications in form and detail may be made without departing from the scope and spirit of this invention. For example, any formulas given above are merely representative of procedures that may be used. Steps may be added or deleted to methods described within the scope of the present invention.

The invention claimed is:

1. A coated cathode comprising:
an active material for supplying and storing Li$^+$ ions;
an electrically conductive additive; and
a coating, different from the active material, that coats surfaces of the active material, wherein the coating comprises amorphous chlorine-doped titanium oxide, wherein the coating has a thickness ranging from 1 to 20 nm,
wherein the chlorine-to-titanium atomic ratio of the coating ranges from 0.04 to 0.19 when measured by Rutherford Backscatter Spectroscopy.

2. The coated cathode according to claim 1, wherein the active material comprises one of the following: a layered transition metal oxide, a spinel phase transition metal oxide, and a polyanionic material.

3. The coated cathode according to claim 1, wherein the electrically conductive additive-comprises a carbon additive, a conductive polymer, a silicide, or a conductive oxide.

4. The coated cathode according to claim 1, wherein the coating coats surfaces of the active material and of the electrically conductive additive.

5. The coated cathode according to claim 4, wherein the coating on the active material and on the electrically conductive additive is conformal.

6. The coated cathode according to claim 1, further comprising a polymer binder, different from the electrically conductive additive, bonded to the active material and to the electrically conductive additive.

7. A battery cell comprising:
a coated cathode according to claim 1, in physical contact with a first electrolyte; and
an anode, in physical contact with a second electrolyte, wherein the first electrolyte and the second electrolyte are the same or are different, and the battery cell is configured so that Li$^+$ ions, comprised in the first electrolyte and the second electrolyte, can move between the first electrolyte and the second electrolyte.

8. The battery cell according to claim 7, wherein at least one of the first electrolyte and the second electrolyte comprises a solid electrolyte.

9. The battery cell according to claim 8, wherein the solid electrolyte is a nanocomposite electrolyte.

10. A method for forming a coated cathode according to claim 1, comprising:
a) providing an active cathode material for supplying and storing Li$^+$ ions;
b) depositing a coating by atomic layer deposition at a temperature ranging from 50 to 130° C., different from the active material, on exposed surfaces of the active material, wherein the coating comprises chlorine-doped titanium oxide and has a thickness ranging from 1 to 20 nm; and
c) providing a conductive additive,
wherein step b) is performed either after step a) and before step c) or after both steps a) and c).

11. A method for forming the battery cell of claim 7, comprising:
providing a coated cathode, comprising:
an active material for supplying and storing Li$^+$ ions, an electrically conductive additive, and a coating, different from the active material, that coats surfaces of the active material, wherein the coating comprises amorphous chlorine-doped titanium oxide, wherein the coating has a thickness ranging from 1 to 20 nm, and
wherein the chlorine-to-titanium atomic ratio of the coating ranges from 0.04 to 0.19 when measured by Rutherford Backscatter Spectroscopy;
providing an anode;
contacting the coated cathode with a first electrolyte and the anode with a second electrolyte, wherein the first electrolyte and the second electrolyte are the same or are different; and configuring the battery cell so that $Li^+$ ions, comprised in the first electrolyte and the second electrolyte, can move between the first electrolyte and the second electrolyte.

12. The method according to claim 11, wherein the active material comprises one of the following: a layered transition metal oxide, a spinel phase transition metal oxide, and a polyanionic material.

13. The method according to claim 11, wherein the electrically conductive additive comprises a carbon additive, a conductive polymer, a silicide, or a conductive oxide.

14. The method according to claim 11, wherein the coating coats surfaces of the active material and of the electrically conductive additive.

15. The method according to claim 14, wherein the coating on the active material and on the electrically conductive additive is conformal.

16. The method according to claim 1, further comprising a polymer binder, different from the electrically conductive additive, bonded to the active material and to the electrically conductive additive.

* * * * *